United States Patent [19]

Swartout

[11] Patent Number: 4,681,345
[45] Date of Patent: Jul. 21, 1987

[54] PASSIVE AUTOMOBILE SEAT BELT REMINDING DEVICE

[76] Inventor: Willson C. Swartout, 31 Phoenix Ave., Newark, Del. 19711

[21] Appl. No.: 888,477

[22] Filed: Jul. 23, 1986

[51] Int. Cl.$^4$ .............................................. B60R 21/10
[52] U.S. Cl. .................................. 280/801; 297/481
[58] Field of Search ............... 280/801, 808; 297/468, 297/481, 483

[56] References Cited

U.S. PATENT DOCUMENTS

| | | | |
|---|---|---|---|
| 3,485,529 | 12/1969 | Marling | 297/481 |
| 3,981,519 | 9/1976 | Cataldo | 297/483 |
| 4,289,352 | 9/1981 | Ashworth | 280/808 |
| 4,323,278 | 4/1982 | Sukopp et al. | 280/808 |

Primary Examiner—John J. Love
Assistant Examiner—Ross Weaver
Attorney, Agent, or Firm—Mortenson & Uebler

[57] ABSTRACT

A device is provided which passively reminds persons seated in an automobile to fasten his or her seat belt. The device comprises seat belt clip means having a projection extending therefrom which, when the seat belt is disengaged, is positioned so that the projection extends into the space normally occupied by a user of the seat and to the back of a person who sits in the seat, thereby causing discomfort until the person properly engages the seat belt. When the seat belt is properly engaged, the projection stows unobstrusively out of the way of driver and controls.

1 Claim, 11 Drawing Figures

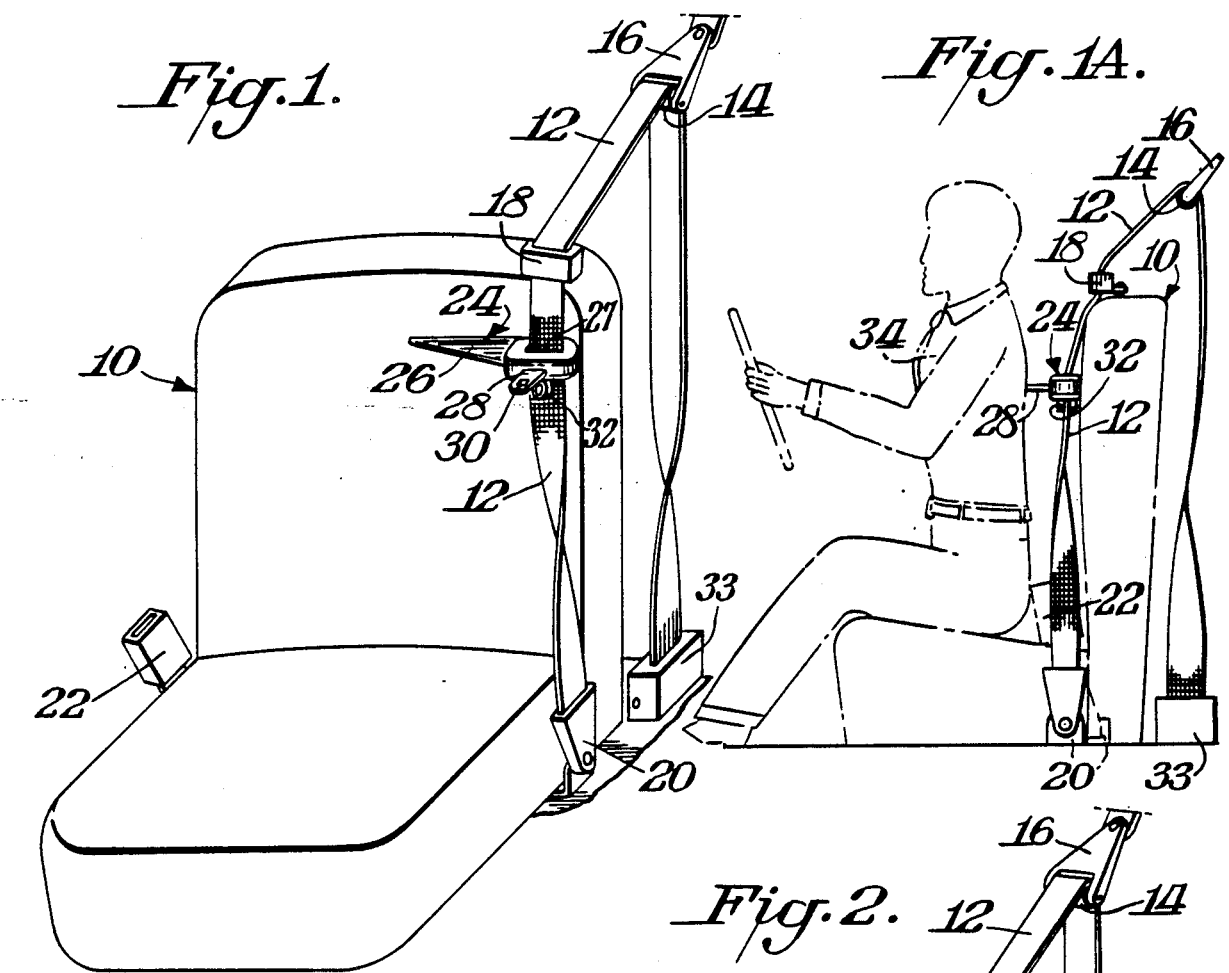
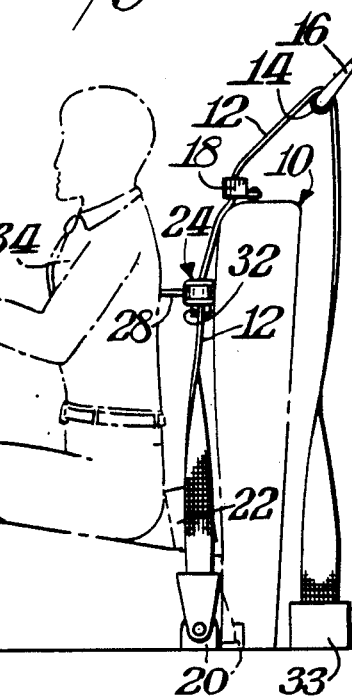
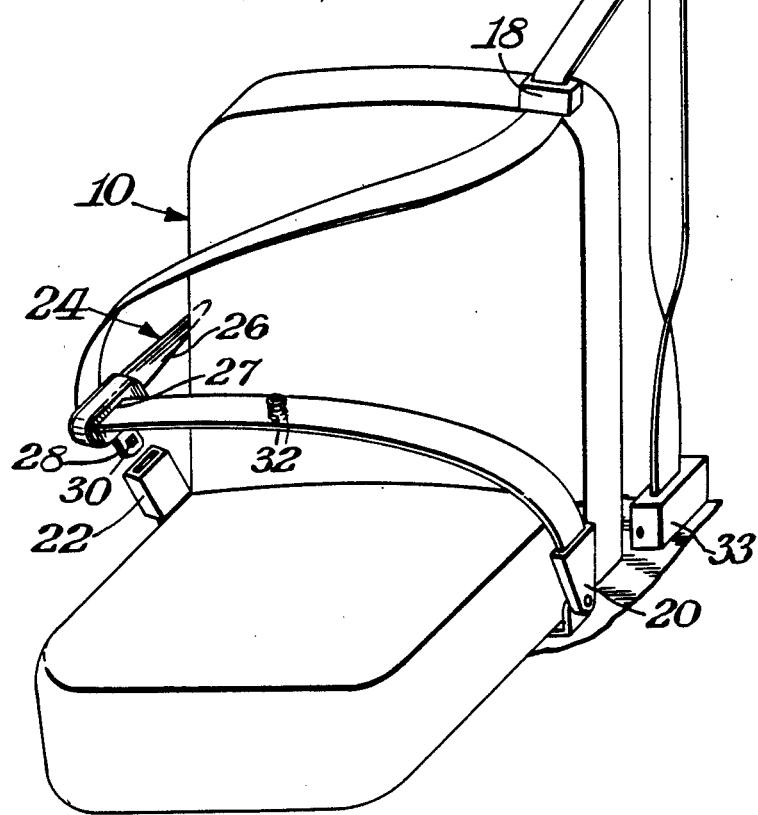

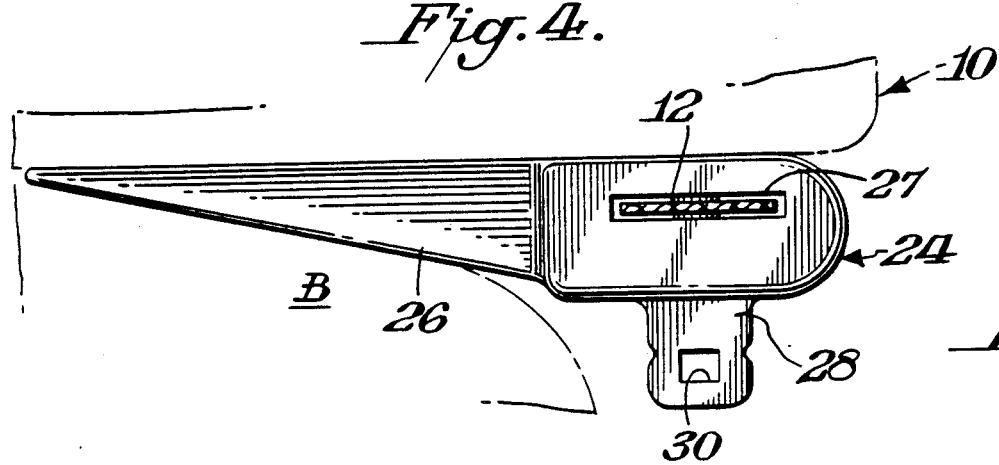
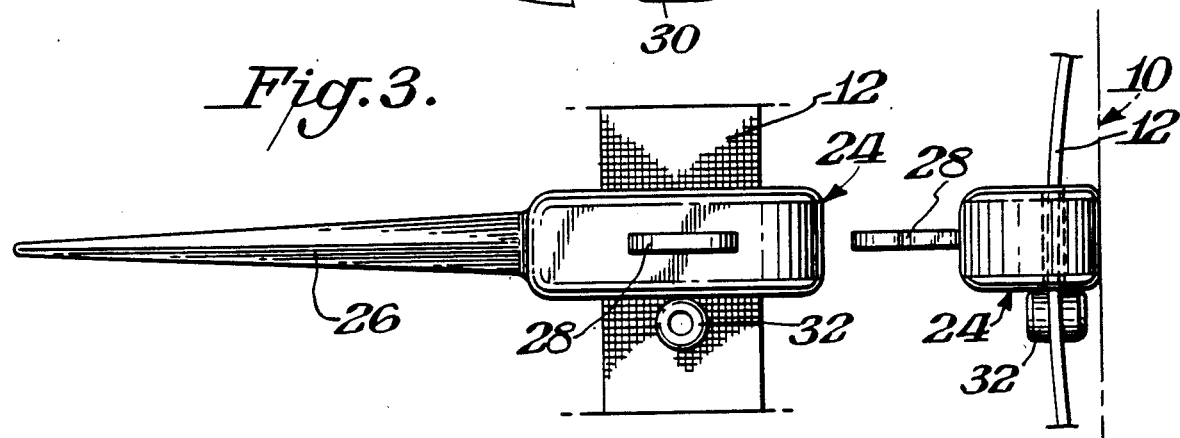
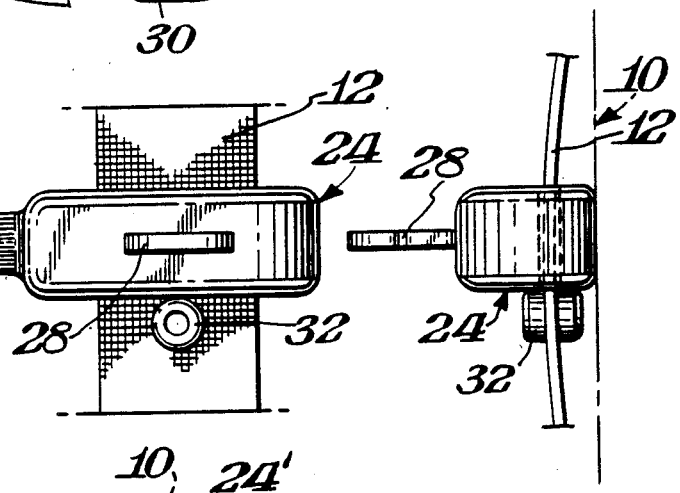
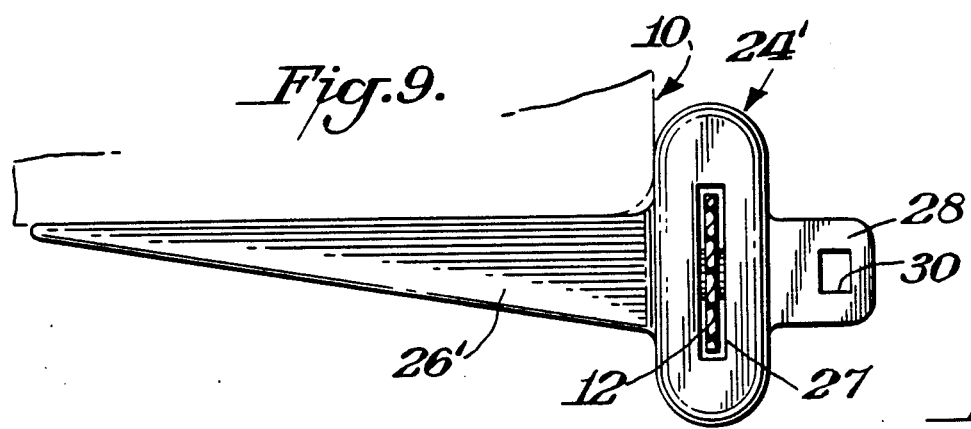
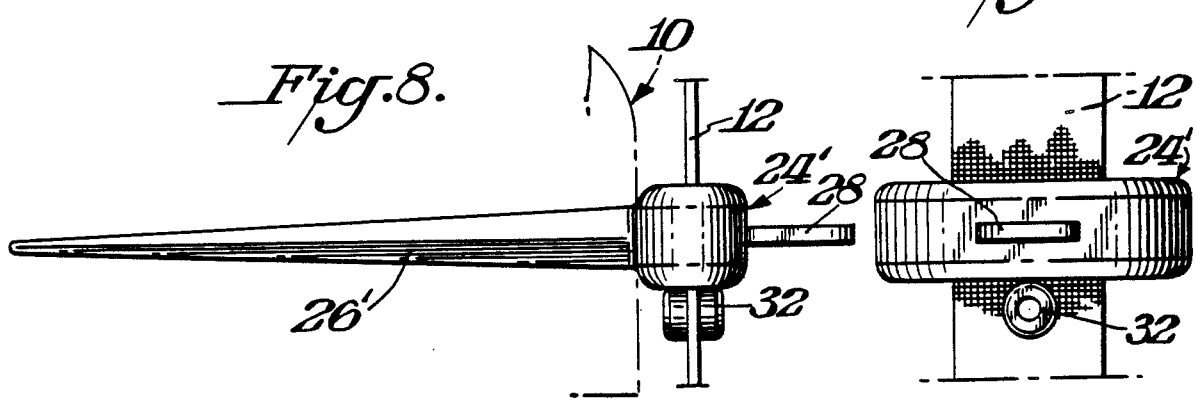

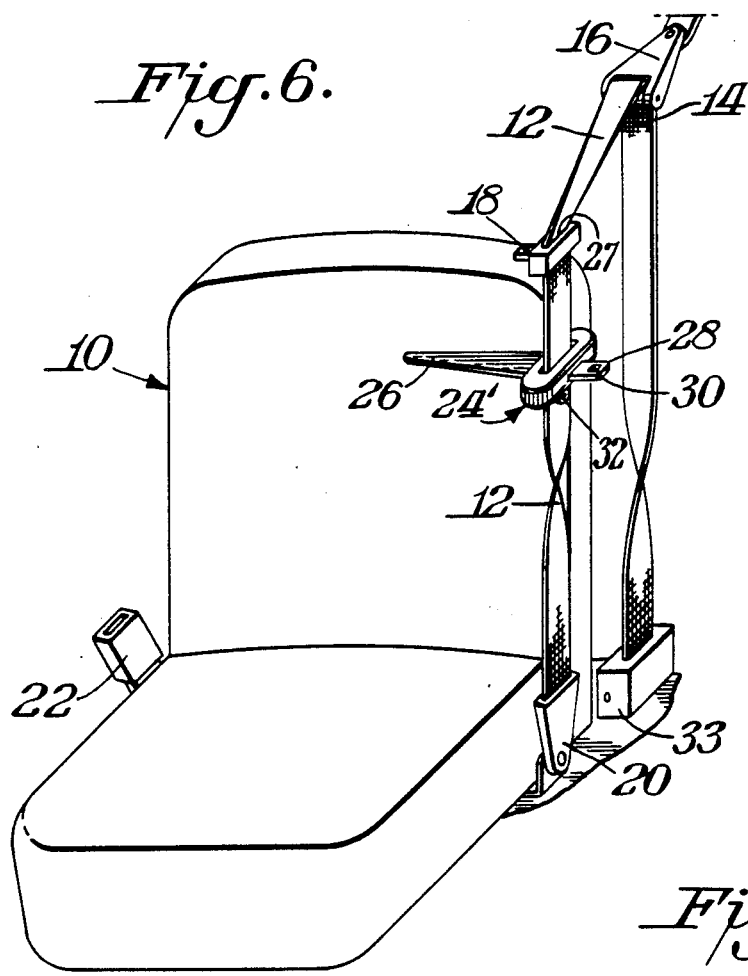
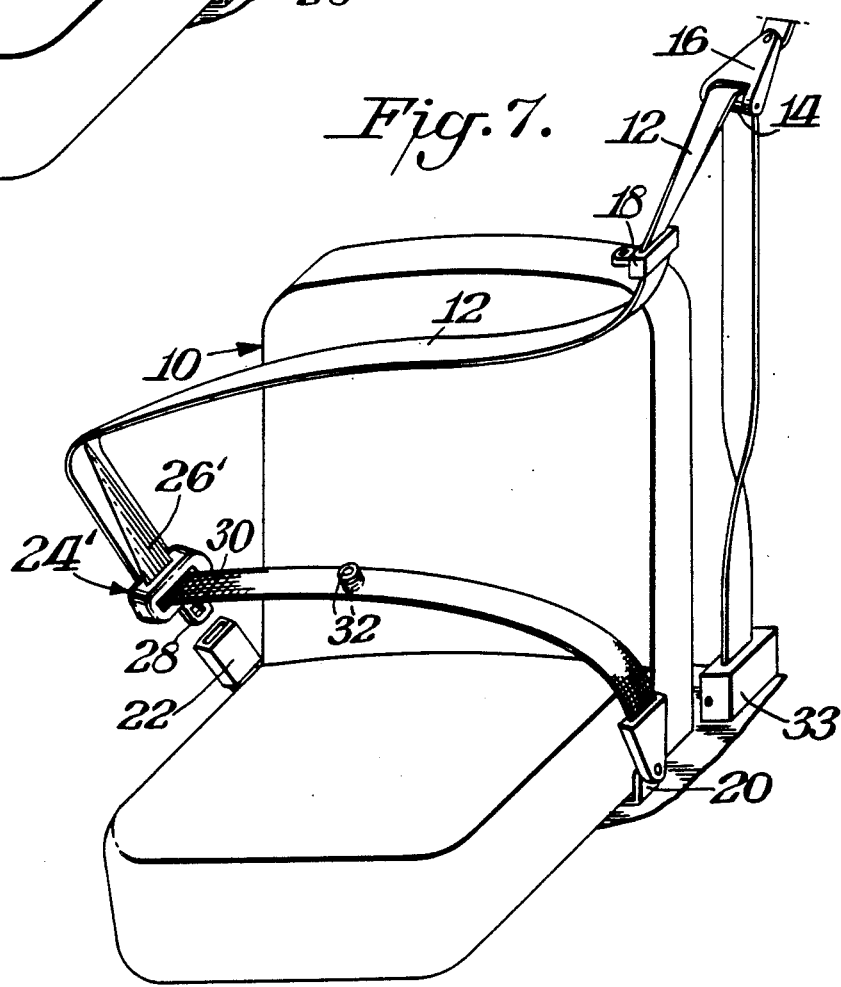

PASSIVE AUTOMOBILE SEAT BELT REMINDING DEVICE

BACKGROUND OF THE INVENTION

This invention relates to safety belts in automotive vehicles.

It is well known statistically that the use of safety belts in automobiles and trucks dramatically reduces the risk of serious injury or death resulting from vehicular accidents. In spite of this known fact, and for various reasons, not all of which are understood, many people will not use their seat belts. Some states, notably Texas and New Jersey, have enacted laws making it illegal not to use one's seat belt.

To overcome this problem of nonuse of seat belts, it is an object of this invention to provide a passive device which reminds persons seated in a vehicle to fasten his or her seat belt. The device causes mild discomfort to the person seated in the vehicle until the seat belt is properly engaged.

SUMMARY OF THE INVENTION

A device is provided which passively reminds persons seated in an automotive vehicle seat to fasten his or her seat belt, the device comprising seat belt clip means for an otherwise conventional seat belt employed in conjunction with the seat, the clip means having a projection extending therefrom such that, when the seat belt is disengaged, the clip is positioned so that the projection extends into the space normally occupied by a user of the seat, and when the seat belt is properly engaged, the clip is positioned so that the projection is stowed unobtrusively out of the way of the user and vehicle controls, thereby causing discomfort to said user of the seat as a result of the projection prodding the user until the user properly engages the seat belt.

BRIEF DESCRIPTION OF THE DRAWINGS

FIG. 1 is a schematic view of the device according to the invention in the disengaged mode.

FIG. 1A shows a user just after sitting down in a vehicle having the device of the invention.

FIG. 2 shows in detail the engagement of the device according to the invention.

FIGS. 3, 4 and 5 show front elevation, top plan and side elevational views of a device according to the invention.

FIGS. 6-10 show an alternative embodiment of the invention in views corresponding, respectively, to FIGS. 1-5.

DETAILED DESCRIPTION OF THE INVENTION AND PREFERRED EMBODIMENTS WITH REFERENCE TO THE DRAWINGS

A device is provided which passively reminds persons seated in a automobile to fasten his or her seat belt. The device comprises seat belt clip means having a projection extending therefrom which, when the seat belt is disengaged, is positioned so that the projection extends to the back of a person who sits in the seat, thereby causing discomfort until the person properly engages the seat belt. When the seat belt is properly engaged, the projection stows unobtrusively out of the way of driver and controls.

A detailed description of the invention and preferred embodiments is best provided with reference to the accompanying drawings wherein FIG. 1 is a schematic front view of an automobile seat 10 having a seat belt 12 with the passive reminder device 24 of the invention attached thereto in the disengaged position. Seat belt 12 extends through opening 27 in the device 24 and passes upwardly through alignment guide 18, over guide roller 14 which is anchored by guide roll anchor 16 and thence to spring-loaded take-up roll and lock mechanism 33. Seat belt 12 passes downwardly through the device of this invention to floor anchor means 20. In the disengaged mode, the device 24 has a projection 26 extending outwardly from the back of seat 10 into the space normally occupied by a driver or passenger in the vehicle. Device 24 has attached thereto a clip 28 with opening 30 for attachment to clip receiver means 22 when the seat belt is in use. Button 32 holds the body of the device 24 in its proper position when belt 12 is not in use.

FIG. 1A is a side elevation of a driver or passenger 34 having just sat down in seat 10. The device 24 has projection 26 which extends outwardly from the back of seat 10 into the back of person 34, making it uncomfortable until the seat belt 12 is moved into its properly engaged mode, shown in detail in FIG. 2. As shown in FIG. 2, to engage the seat belt 12, the seat belt and device 24 are pulled across the chest of the user, clip 28 is inserted into clip receiver 22 and is held there in place. In this embodiment, the device 24 extends backwardly and unobtrusively out of the way when the seat belt is properly engaged.

FIG. 3 is a front elevation of the device 24 according to the invention showing seat belt 12 extending through the device 24. In the disengaged mode, button 32 holds the device 24 at its proper elevation.

FIG. 4 is a top plan view of the device 24 showing the general shape of projection 26 in contact with the back "B" of a user (in phantom), extending outwardly from the back of seat 10 into the space occupied by the user.

FIG. 5 is a side elevation of the device 24 in the disengaged position having seat belt 12 passing therethrough and showing clip 28 and button 32.

Depending upon the positioning of seat belt alignment guide 18 in relation to seat 10, other configurations of the passive reminder device of this invention may be required. One alternative embodiment is shown in FIGS. 6-10 in which the alternate device 24' has the clip 28 extending lengthwise therefrom. Projection 26' acts exactly as projection 26.

FIG. 7 shows in detail the engagement of this alternate embodiment.

FIGS. 8, 9 and 10 show front elevation, top plan and side elevational views of the alternate embodiment of the device 24' according to the invention.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow. For example, the projection 26 could be tubular in shape and be nearly as discomforting as the blade 26 shown.

What is claimed is:

1. A device which passively reminds persons seated in an automotive vehicle seat to fasten his or her seat belt, the device comprising seat belt clip means for an otherwise conventional seat belt employed in conjunction with said seat, the clip means having a projection extending therefrom such that, when the seat belt is disengaged, said clip means is positioned so that said projection extends into the space normally occupied by a user of said seat, and when the seat belt is properly engaged, said clip means is positioned so that the projection is stowed unobtrusively out of the way of the user and vehicle controls, thereby causing discomfort to said user of said seat as a result of said projection prodding said user until the user properly engages the seat belt.

* * * * *